(12) United States Patent
Myatt

(10) Patent No.: US 7,102,499 B2
(45) Date of Patent: Sep. 5, 2006

(54) ELECTRONIC DEVICE FOR A TIRE HAVING AN EXTENSIBLE ANTENNA

(75) Inventor: David Myatt, Chateaugay (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 24 days.

(21) Appl. No.: 10/793,368

(22) Filed: Mar. 4, 2004

(65) Prior Publication Data

US 2004/0189456 A1 Sep. 30, 2004

(30) Foreign Application Priority Data

Mar. 4, 2003 (EP) .................................. 03290517

(51) Int. Cl.
*B60C 23/00* (2006.01)
(52) U.S. Cl. ............... 340/447; 340/442; 340/444; 340/445; 340/446; 340/448; 116/34 R
(58) Field of Classification Search .............. 340/445, 340/442, 444, 447, 448, 443, 446; 73/146, 73/146.4, 146.5, 146.8; 116/34 R; 342/44, 342/50, 51
See application file for complete search history.

(56) References Cited

U.S. PATENT DOCUMENTS

| | | | | |
|---|---|---|---|---|
| 5,541,575 A | * | 7/1996 | Virnich | 340/506 |
| 5,731,754 A | * | 3/1998 | Lee et al. | 340/447 |
| 6,885,291 B1 | * | 4/2005 | Pollack et al. | 340/445 |
| 2004/0252072 A1 | * | 12/2004 | Adamson et al. | |

* cited by examiner

*Primary Examiner*—Hung Nguyen
(74) *Attorney, Agent, or Firm*—E. Martin Remick; Adam Arnold

(57) ABSTRACT

An electronic communication device for a tire includes a radio device and an antenna intended to be attached to or embedded in a tire, the antenna being spirally or helically shaped to absorb tensile and bending stress applied by the tire. The antenna body may be a wire formed of spring steel, brass or zinc coated spring steel, or spring brass. A coating of insulating material coats the radio device and antenna for mounting on or in, and operation in, a tire structure.

17 Claims, 2 Drawing Sheets

ELECTRONIC DEVICE FOR A TIRE HAVING AN EXTENSIBLE ANTENNA

BACKGROUND AND SUMMARY

Electronic devices integrated in a tire can provide functions such as identification and tracking during manufacture, distribution, and use, and measurement of physical parameters such as pressure and temperature during use of the tire. Many systems utilize radio frequency communication between the tire and the external monitoring or interrogating device. A radio frequency communication link requires one or more antennas.

An electronic device and antenna that is securely attached to a tire structure, for example, by being embedded in the elastomeric material of the tire or attached by means of an elastomeric patch that is bonded to the tire, is desirable. Such mounting or attachment provides permanent, tamper-proof integration of the device with the tire. Integrating an antenna in the tire, however, presents difficulties. A tire undergoes flexing and distortions during normal use that can cause the antenna to fracture or separate from the electronics device. Further, if the electronics device and antenna are to be integrated with the tire during manufacture and before curing of the tire, the manufacturing process includes many steps, such as shaping and curing, which could cause the wire to break.

The invention provides an improved electronics device with a radio frequency antenna for integration with a tire that avoids problems in the art. According to the invention, the improved electronics device includes an antenna that is shaped to absorb stresses imposed on it by the tire or tire manufacturing process. According to the invention, the antenna is shaped as a spiral winding, which provides extensibility in the longitudinal direction and flexibility in other directions. According to a preferred embodiment, the antenna has a helical shape, having a plurality of turns along its length.

An improved electronic communication device for a tire of a vehicle, according to the invention, comprises a radio device for communicating information from the tire to a remote radio receiver, and at least a first antenna wire connected to and extending from said radio device, the at least first antenna wire is formed with a plurality of helical turns, characterised in that the antenna is completely coated with an electrically insulating material.

Preferably, the radio device is also coated with an electrically insulating material.

According to one embodiment of the invention, the antenna wire is formed as a monopole or dipole antenna and terminates at a distance from the radio device. This embodiment is useful for relatively high frequency radio devices, for example, the radio devices operable at a frequency at or above 130 MHz.

According to another embodiment, the antenna wire forms a loop antenna, which is advantageous for lower frequency communication. Such devices may operate, for example, at about 13 MHz, or less.

The antenna material can be any material capable of transmitting radio frequency energy. Advantageously, and preferably for use in or on a tire because of its durability under fatigue conditions, the antenna body is a wire formed of spring steel, brass coated spring steel, spring brass or some copper alloys and coated steel. Such materials are capable of surviving the bending and flexing deformations typically experienced by the tire.

According to another aspect of the invention, the device includes a rubber layer to facilitate integration of the device with a tire. Preferably, the layer of rubber material is electrically non-conductive and surrounds the radio device and the at least first antenna wire. The device may be integrated by embedding it in a portion of a tire, or by attaching to a surface of the tire in the manner of a patch.

The invention also includes a tire having an electronic communication device, the tire comprising a crown region and sidewalls extending radially inward from the crown and terminating in beads, the tire further comprising a radio device for communicating information from the tire to a remote radio receiver and at least a first antenna wire connected to and extending from said radio device, the antenna being formed with a plurality of helical turns, the invention characterised in that the radio device and antenna are integrated into the tire with a coating of electrically non-conductive material surrounding the at least first antenna wire.

The radio device and antenna can be integrated in the sidewall of the tire. They can also be integrated in the crown of the tire.

The invention will be better understood by reference to the following detailed description in conjunction with the appended drawings.

BRIEF DESCRIPTION OF THE DRAWING FIGURES

DETAILED DESCRIPTION

Figure 1:
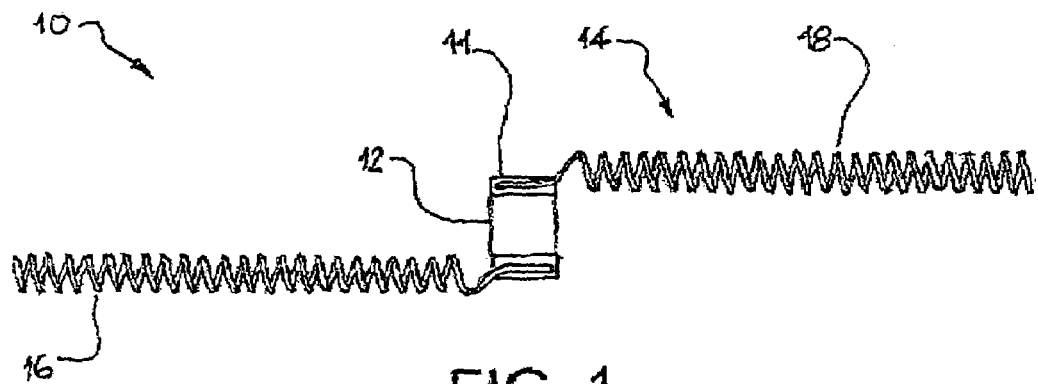
FIG. 1 is an illustration of an electrical device and antenna in accordance with the invention.

FIG. 1 shows an electronics device 10 for a tire which includes a radio device 12 and an antenna 14 in accordance with one embodiment of the invention. The figures are not drawn to scale; certain features are enlarged for convenience. The electronics device 10 itself may be an identification or tracking device, such as may be used in manufacturing, distribution, and sale activities. The device 10 may also be or include a monitoring device for measuring temperature, pressure or other physical parameters in an operating tire. The radio device 12 is used to transmit information from the electronics device to a remote reader (not illustrated) external of the tire, and/or to receive information from the remote device.

The antenna 14 is used to transmit information to and/or receive it from the external device by radio frequency. In addition, the antenna may also serve to receive energy from an interrogation device. Such radio devices may operate as receivers, transmitters, transponders or reflectors, and, because the antenna of the invention is useful for all these devices, in the following description, the term "radio device" is intended to be inclusive.

The antenna 14 is shown as a dipole, having two branches 16, 18 extending from the radio device in substantially opposite directions. The invention may advantageously be used with dipoles, monopoles, or multiple antennas as the transmission and space conditions require. The antenna 14 extends from the radio device and terminates at a distance from it. This antenna configuration is advantageous for relatively high frequency communication, for example, at frequencies at or above 130 MHz.

Figure 2A:
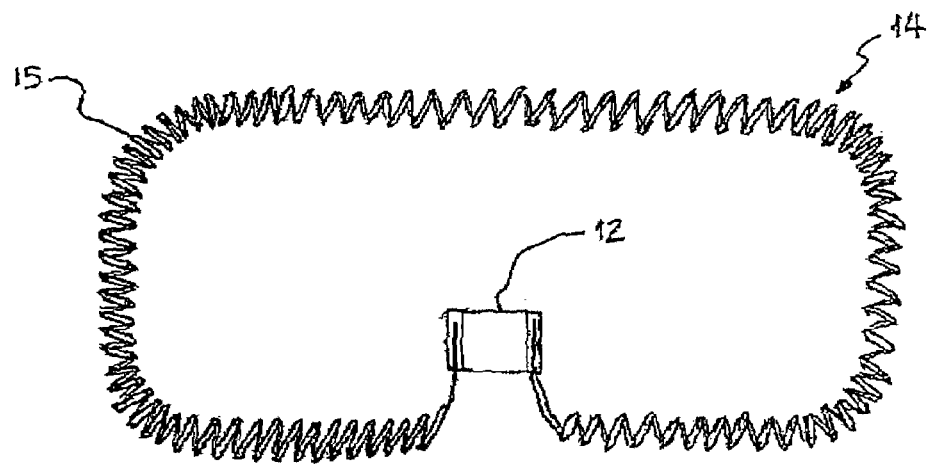
FIGS. 2a and 2b are drawings of two alternative embodiments of an electrical device and antenna in accordance with the invention.
Figure 2B:
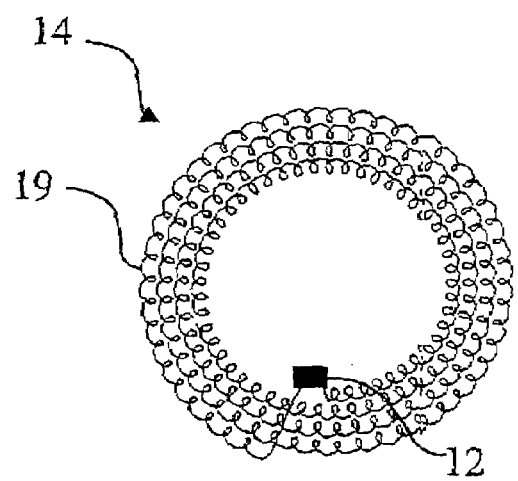

As illustrated in FIGS. 2a and 2b, the antenna may be configured as a loop antenna 15. A single loop is shown in FIG. 2a, although multiple loops may, of course, be formed (see FIG. 2b, multiple loops antenna 19). This configuration is advantageous for communication at relatively lower frequencies than the antenna of FIG. 1, for example, at about 13 MHz. Such antenna could also be used for transmitting data or energy at lower frequency, such as 125 kHz.

The antenna 14 is shaped in a helical spiral to provide some longitudinal extensibility in the direction along which the antenna extends from the radio device 12 and bending flexibility in the directions other than the longitudinal direction. The illustrated embodiment of FIG. 1 shows a helically wound wire which is considered a preferred embodiment of the antenna 14.

The antenna 14 is shown connected to solder pads 11 on the radio device 12. Of course, other connections could be made according to the how the radio device is made.

Figure 3:
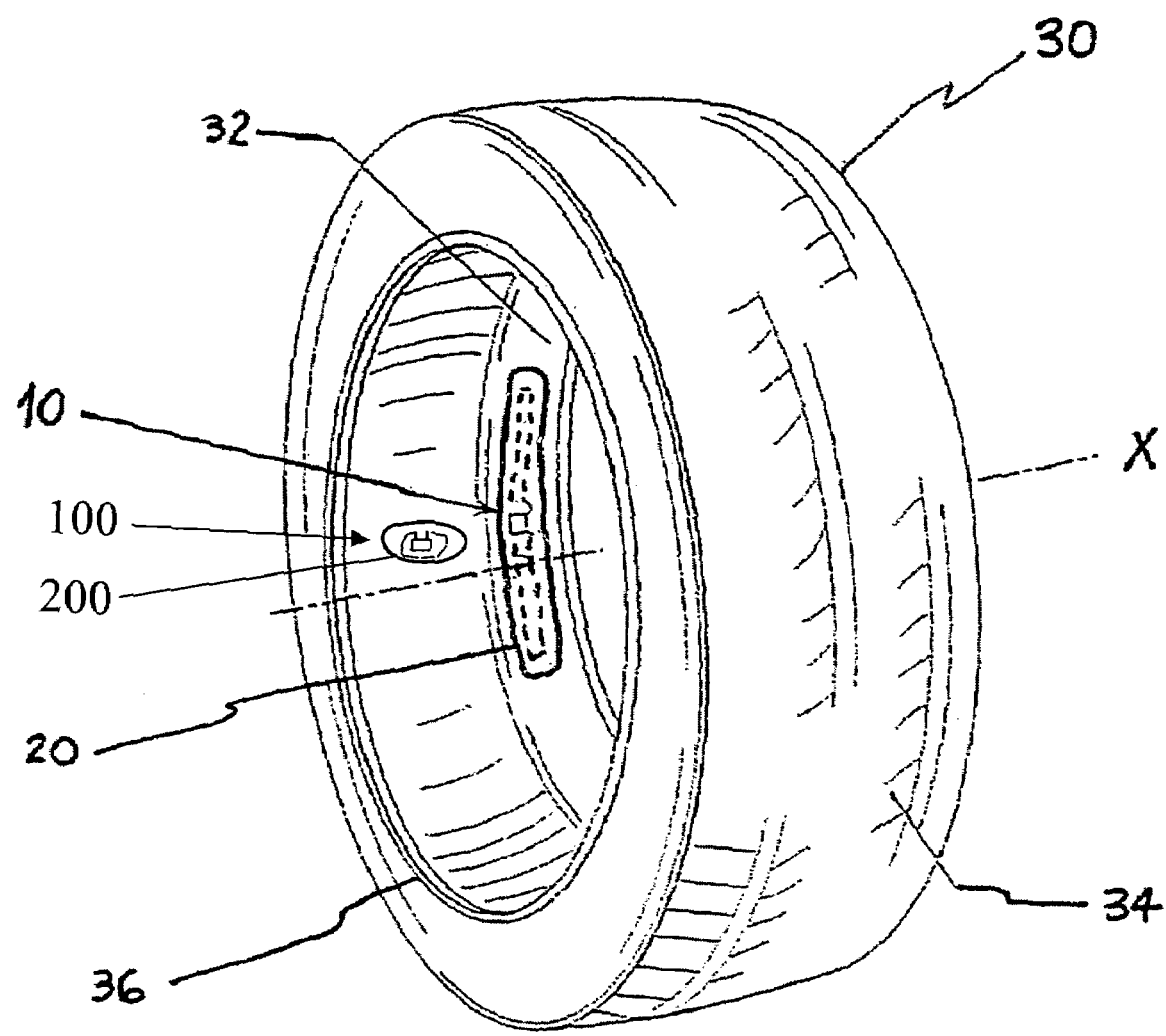
FIG. 3 is a perspective view of a tire showing two placements for an electrical device with an antenna.

As shown in FIG. 3, the radio device 12 and antenna 14 make a device 10 that can be advantageously positioned in a number of different places in a tire 30. In FIG. 3, the device 10 is shown integrated in the sidewall 32 of the tire 30 and the device 100 is integrated in the crown 34. The electronics device 10 (100) may be applied under or embedded in a rubber patch 20 (200) which is adhered to a surface of the tire 30, as shown in FIG. 3, on the inner surface of the sidewall 32 (inner surface of the crown 34). The position of the antenna 14 is indicated by the broken lines. The radio device 12 is shown exposed at the surface of the patch 20, but may itself also be embedded in the rubber. The electronics device 10 (100) will typically be cured in the patch. During this process, the patch rubber will flow into and fill the central portion of the antenna coil.

Alternatively, the radio device 12 and antenna 14 may be embedded in the tire structure itself or layered under rubber material in the tire 30 which forms a surface of the tire. For example, the radio frequency device 10 may be positioned between a carcass ply and an inner liner, between the carcass ply and the sidewall cover, and/or between the belt package and the tread. By "integrated" the inventor refers to any manner of incorporating the antenna 14 and radio device 12 in a tire in a way that positions the device and antenna on or in a surface of the tire. As in the patch, the rubber material will flow into and fill the antenna coil during the tire curing process.

A single tire may include one or several such devices, for example, if it is desired to monitor physical parameters at different locations in the tire or to monitor different parameters. The location for the device will depend, in part, on its function. For monitoring temperature or pressure, or for providing identification, the device may be placed on the sidewall 32 near the tire bead area 36 to avoid as far as possible experiencing flexing of the tire during rolling. If the device is monitoring a function or condition of the tread, the device would be placed in the crown 34.

Referring now again to FIGS. 1 and 2, those skilled in the tire art understand that a tire experiences significant deformation during the manufacturing process, from shaping from a cylindrical shape on the tire building drum to the familiar toroidal tire shape, and from pressure during curing. Also, during use of the tire, the sidewall and tread area undergo tensile and compressive forces as that portion of the tire moves into, through, and out of ground contact. A tensile force applied in the antenna 14 longitudinal direction will be absorbed by the spiral turns along the length of the antenna 14, permitting some extension along the length of the antenna. Length is understood to mean the general direction in which the antenna 14 extends from the radio device, which is substantially linear in FIG. 1 and follows a looping course in FIG. 2. This extensibility helps prevent damage or breakage of the antenna 14 when tension is applied, and is a significant advantage for an antenna attached to a tire.

In addition, the shape of the antenna 14 allows it to bend easily. If integrated in the sidewall 32 of the tire as shown in FIG. 3, the device 10 will experience bending in the tire's axial direction X as the sidewall 32 bulges when in ground contact. Also, the device 10 may experience some bending in the tire's radial direction as the sidewall 32 distorts to allow the crown to flatten into ground contact.

The antenna 14 may be formed of spring wire, spring steel, brass coated spring steel, spring brass or other copper alloys and coated steel. Such materials are capable of surviving the bending and flexing deformations typically experienced by the tire.

The size and configuration of the antenna 14 is selected according to the frequency at which it will operate and its environment. The number, diameter, and pitch of the coils will determine the overall length. As mentioned, a monopole or dipole configuration is useful for higher frequencies, and a loop configuration is useful at lower frequencies. The inventor has found that the extensibility and flexibility of the antenna allows a relatively small diameter wire to survive in the tire environment. For example, a brass-coated steel wire of 0.2 mm diameter which is formed as a helix of about 1.5 mm outer diameter has been successfully integrated and operated in a tire. The inventor believes that wire diameters of 0.05 to 0.25 mm and helixes of 0.5 mm to 2 mm outside diameter will function successfully in the tire environment.

In a first preferred embodiment as presented in FIG. 1, the antenna is a dipole antenna with two parts, the length of each leg being not more than 50 mm. In this embodiment, the associated radio device is operable at a frequency around 900 MHz or more. The associate radio device may be an rfid device, for example.

The antenna may also be a monopole antenna with a length of 100 mm at most.

In a second preferred embodiment, for an associated radio device operable at 433 MHz, the antenna is a dipole antenna of two parts, each part being not more than 100 mm, and more preferably approximately 65 to 75 mm when embedded in rubber. The associated radio device may be, for example, a surface acoustic wave device. In monopole form, the antenna would have a length of not more than 200 mm, and more preferably, about 130 to 140 mm.

In addition, the antenna will be tuned to compensate for being embedded in a tire. Typically, this requires shortening the antenna from the free-air tuned length. Tuning may be accomplished through iterations of embedding an antenna in rubber and testing. Alternatively, a network analyzer could be used to determine the actual resonant frequency of the antenna embedded in the particular rubber to reduce the iterations required to find the optimum length. Alternatively, the antenna could be adjusted by adding a tuning reactance in or attached to the device at the feedpoint.

Because the rubber in a tire has some electrical conductivity from carbon black, a coating layer is provided on the antenna to insulate the wire from the tire rubber. The coating is formed of an insulating material and is sufficiently thick to provide spacing between the conductive elastomeric material and the antenna 14 for avoiding bleed-through discharges to the elastomeric material. According to a preferred embodiment, the coating is at least 0.02 mm thick in the uncured state as measured perpendicular to the antenna. This thickness represents an average thickness for the antenna body, which may be determined, for example, by measurement of the volume of material applied to the antenna. According to the invention, the coating material has a dielectric constant less than that of the elastomeric material, and preferably less than 3. In addition, the coating material preferably has a surface resistivity of at least $10^{12}$ ohms/sq and a volume resistivity of at least $10^9$ ohms*cm. Further, the coating material preferably has a dissipation factor less than 0.5. The coating material will provide an improvement in the transmission range, and as will be understood below, those skilled in the art may select the coating material and thickness to provide the range necessary for the particular conditions under which the device will be read.

Materials useful for forming the coating material to include electrical shrink tubing, thermoplastic polycarbonate, butadiene rubber, low carbon rubber (low carbon being defined to be a rubber mixture having less than 10% carbon black by weight) or silica reinforced rubber, an isocyanate-based rubber to metal adhesive such as Chemlok (brand) TS3604-50 adhesive (available from Lord Corporation, Chemical Products Division, 2000 West Grand View Boulevard, Erie, Pa.), polyethylene, insulating varnish, epoxy, TPE cellulose acetate, polypara-xylylene (commonly known as "parylene"), and insulating polyester varnish. Such materials have certain advantages, including the ability to apply in the needed thickness. In addition, these coating materials have good adherence with both the antenna material (brass or steel in the described embodiment) and the rubber material of the tire or patch. Thus, an additional adhesive coating or layer is not needed.

Alternatively, the antenna may be embedded directly in a rubber material having appropriate electrical properties, that is, a surface resistivity of at least $10^{12}$ ohms/sq, a volume resistivity of at least $10^9$ ohms*cm, and a dissipation factor less than 0.5.

To integrate the device in a tire, the device 10 (100) may be first embedded in a rubber layer. Preferably, the rubber layer is electrically non-conductive to avoid transmission interference. The rubber layer may be placed in the tire sidewall 32 between the exterior sidewall rubber and casing plies, for example. Preferably, the device 10 is oriented so that the antenna 14 is perpendicular to the reinforcing cords in the casing to avoid interference.

The rubber layer may be a patch 20 or 200 as illustrated in FIG. 3 which is adhered to the inner sidewall 32 (respectively crown) surface by known means.

The invention has been described in terms of preferred principles, embodiments, and structures for the purposes of description and illustration. Those skilled in the art will understand that substitutions may be made and equivalents found without departing from the scope of the invention as defined by the appended claims.

What is claimed is:

1. An improved electronic communication device for a tire of a vehicle, comprising a radio device for communicating information from the tire to a remote radio receiver, and at least a first antenna wire connected to and extending from said radio device, the at least first antenna wire is formed with a plurality of helical turns, characterised in that the at least first antenna wire is coated with an electrically insulating material having a dissipation factor less than 0.5, a surface resistivity of at least $10^{12}$ ohms/sq, and a volume resistivity of at least $10^9$ ohms*cm to isolate it from the tire rubber.

2. An improved electronics device as claimed in claim 1, wherein the radio device is also coated with an electrically insulating material.

3. The improved electronics device as claimed in claim 1, wherein the antenna is toned as one of a monopole or a dipole and terminates at a distance from the radio device.

4. The improved electronics component assembly as claimed in claim 3, wherein the radio device is operable at a frequency of at least 130 MHz.

5. The improved electronics device as claimed in claim 3, wherein the length of the antenna is less than 100 mm.

6. The improved electronics device as claimed in claim 5, wherein the antenna is a dipole antenna with two parts, each part having a length not more than 50 mm.

7. The improved electronics device as claimed in claim 3, wherein the radio device is operable at a frequency of at least 433 MHz, and the antenna has a length of not more than 200 mm.

8. An improved electronics device as claimed in claim 1, wherein the coating material is selected from a group comprising electrical shrink tubing, thermoplastic polycarbonate, butadiene rubber, low carbon rubber, isocyanate based adhesive, polyethylene, insulating varnish, epoxy, TPE cellulose acetate, parylene, and insulating polyester varnish.

9. The improved electronics device as claimed in claim 1, wherein the antenna is formed as one or more loops.

10. The improved electronics device as claimed in claim 9, wherein the radio device is operable at a frequency of about 13 MHz or less.

11. The improved electronics component assembly as claimed in claim 1, further comprising a layer of rubber surrounding the antenna and radio device.

12. The improved electronics device as claimed in claim 11, wherein the layer of rubber material forms a patch for mounting the device to a sidewall of a tire, the layer of rubber material having a mating side carrying an adhesive material.

13. The improved electronics device as claimed in claim 11, wherein the layer of rubber material is an electrically non-conductive rubber.

14. The improved electronics device as claimed in claim 1, wherein the antenna is formed from a wire having a diameter of 0.15 to 0.22 mm and coiled in a helix having an outside diameter of 0.5 to 2 mm.

15. A tire having an electronic device, the tire comprising a crown region and sidewalls extending radially inward from the crown and terminating in beads, the tire further comprising a radio device for communicating information from the tire to a remote radio receiver and at least a first antenna wire connected to and extending from said radio device, the antenna being formed with a plurality of helical turns, wherein the radio device and antenna are integrated into the tire with a coating of electrically non-conductive material having a surface resistivity of at least $10^{12}$ ohms/sq, a volume resistivity of at least $10^9$ ohms*cm, and a dissipation factor less than 0.5 surrounding the at least first antenna wire.

16. A tire having an electronic device as claimed in claim 15, wherein said radio device and antenna are integrated into a sidewall of the tire.

17. A tire having an electronic device as claimed in claim 15, wherein said radio device and antenna are integrated into the crown of the tire.

* * * * *